(12) United States Patent
Young (10) Patent No.: US 6,728,791 B1
(45) Date of Patent: Apr. 27, 2004

(54) RAID 1 READ MIRRORING METHOD FOR HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 204 days.

(21) Appl. No.: 10/051,960

(22) Filed: Jan. 16, 2002

(51) Int. Cl.$^7$ .................. G06F 12/00; G06F 13/00; G06F 12/16; G06F 13/10; G06F 13/14

(52) U.S. Cl. .................. 710/5; 710/1; 710/20; 710/21; 710/23; 710/24; 710/38; 710/62; 710/63; 710/64; 710/72; 710/74; 711/100; 711/114; 711/161; 711/162; 714/1; 714/6

(58) Field of Search .................. 710/1, 3, 4, 5, 710/7, 20, 21–24, 26, 28, 31, 36, 38, 62, 63, 64, 72–74; 711/100, 161, 162, 114, 200; 714/1, 6

(56) References Cited

U.S. PATENT DOCUMENTS

| | | | | |
|---|---|---|---|---|
| 5,588,110 A | * | 12/1996 | DeKoning et al. ............. | 714/5 |
| 5,592,648 A | * | 1/1997 | Schultz et al. .............. | 711/114 |
| 5,764,903 A | * | 6/1998 | Yu .............................. | 709/208 |
| 5,944,800 A | * | 8/1999 | Mattheis et al. .............. | 710/23 |
| 5,974,502 A | * | 10/1999 | DeKoning et al. ........... | 711/114 |
| 6,044,444 A | * | 3/2000 | Ofek ............................ | 711/162 |
| 6,098,129 A | * | 8/2000 | Fukuzawa et al. ............. | 710/65 |
| 6,269,431 B1 | * | 7/2001 | Dunham ....................... | 711/162 |
| 6,366,987 B1 | * | 4/2002 | Tzelnic et al. .............. | 711/162 |
| 6,397,309 B2 | * | 5/2002 | Kedem et al. .............. | 711/162 |
| 6,477,591 B1 | * | 11/2002 | VanderSpek ................. | 710/38 |
| 6,496,908 B1 | * | 12/2002 | Kamvysselis et al. ...... | 711/162 |
| 6,530,035 B1 | * | 3/2003 | Bridge .......................... | 714/6 |
| 6,574,709 B1 | * | 6/2003 | Skazinski et al. ........... | 711/119 |
| 6,581,143 B2 | * | 6/2003 | Gagne et al. ................ | 711/162 |
| 6,587,935 B2 | * | 7/2003 | Ofek ........................... | 711/162 |
| 6,598,134 B2 | * | 7/2003 | Ofek et al. .................. | 711/162 |
| 6,654,954 B1 | * | 11/2003 | Hicks .......................... | 717/162 |
| 2002/0103966 A1 | * | 8/2002 | Wu et al. ................... | 711/114 |
| 2002/0103968 A1 | * | 8/2002 | Grover ........................ | 711/114 |

OTHER PUBLICATIONS

"Dual–chained Control Block Data Structure With Synonymous Logical and Physical Chains", IBM Technical Disclosure Bulletin, Oct. 1990, US, Volume No. 33, Issue No. 5, p. 312–317, Oct. 1, 1990.*

* cited by examiner

Primary Examiner—Jeffrey Gaffin
Assistant Examiner—Tanh Q. Nguyen
(74) Attorney, Agent, or Firm—Gunnison, McKay & Hodgson, L.L.P.; Forrest Gunnison (57) ABSTRACT

A single host adapter hardware I/O control block contains information used to specify a transfer of data from a first target device to a host system and in addition information that specifies whether the data is mirrored, and if so, identifies a second target device on which the data is to be read. After transferring the single hardware I/O control block to the host adapter integrated circuit, the host adapter integrated circuit determines whether the hardware I/O control block specifies a mirrored transaction. If a mirrored transaction is specified, the host adapter integrated circuit generates a second hardware I/O control block for the second target device using the information in the first hardware I/O control block. When the execution of both hardware I/O control blocks is complete, the host adapter integrated circuit provides a single completion notification to the host system.

18 Claims, 8 Drawing Sheets

RAID 1 READ MIRRORING METHOD FOR HOST ADAPTERS

BACKGROUND OF THE INVENTION

1. Field of the Invention

The present invention relates generally, to host adapters that interface two I/O buses and more particularly, to implementing RAID 1 mirroring by a host adapter interfacing two I/O buses.

2. Description of Related Art

Host adapter integrated circuits were widely used for interfacing two I/O buses such as a host computer I/O bus and a SCSI bus. Frequently, a host adapter integrated circuit was used in a data storage system that implemented redundant data storage.

Redundancy is increasingly becoming a requirement for data storage systems. If one data storage device fails, the data on the failed data storage device preferably can be reconstituted or reconstructed using data content on other data storage devices in the data storage system.

The simplest scheme for providing data redundancy was mirroring of data storage devices where data written to one data storage device was also written on another data storage device. This mirroring scheme was also referred to as RAID 1. With mirroring, if one data storage device failed, the data content was retrieved from the mirror data storage device. As disk drive prices have fallen, the mirroring scheme has increased in popularity.

One implementation of data mirroring used a software manager to identify two data storage devices, such as SCSI disk drives, and to issue write commands for the same data to the two data storage devices. The software manager generated two data write commands, which in the simplest case differed only in the target data storage device specified. This mirroring scheme was implemented only at the software manager level. The data storage devices, host adapters and the corresponding management software required no modifications to support this data mirroring technique. To these devices, the data mirroring was not evident because the devices were simply processing routine write commands.

While this data mirroring technique is easily implemented, the technique generates additional traffic on the I/O bus between the device executing the software manager and the host adapter for example. Frequently, this I/O bus is the busiest bus in the data storage system and so additional traffic on this I/O bus further exacerbates any I/O bottlenecks associated with this I/O bus. Also, since two commands are generated for each write, the memory in the system executing the software manager must have the capability two store the two commands as well as any memory structures used in monitoring the processing of the two commands. There is a similar requirement for reading mirrored data. Also, in addition to executing the software manager, the system processor must execute instructions to build and monitor the execution of the duplicate commands required for the mirrored transaction. Thus, while data redundancy is desirable, it adversely affects system performance in several different respects, and in some cases may prevent the implementation of mirrored transactions.

SUMMARY OF THE INVENTION

According to one embodiment of the present invention a method for data mirroring by a host adapter integrated circuit includes receiving a single hardware I/O control block by the host adapter integrated circuit. The single hardware I/O control block specifies a data operation, either a read or a write operation, using a first data storage device. This method also includes analyzing the single hardware I/O control block by the: host adapter integrated circuit to determine whether the single hardware I/O control block specifies a mirrored transaction using a second data storage device.

In analyzing the single hardware I/O control block, the host adapter integrated circuit determines whether a pointer in a first field of the single hardware I/O control block is valid. If the pointer in the first field is valid, the host adapter integrated circuit generates a second hardware I/O control block. The second hardware I/O control block specifies the operation using the second storage device.

The method also includes executing the first hardware I/O control block and the second hardware I/O control block independently by the host adapter integrated circuit. For a write operation, the host adapter integrated circuit posts as complete only a last of the first and second hardware I/O control blocks to complete executing. For a read operation, when execution of one of the first and second hardware I/O control blocks is complete, the host adapter sets an abort bit in the other of the hardware I/O control blocks. Upon the target associated with the other of the hardware I/O control blocks acknowledging the abort, the host adapter posts as complete the first of the hardware I/O blocks to complete execution.

In another embodiment of the host adapter data mirroring process, a single hardware I/O control block is received by a host adapter integrated circuit. The single hardware I/O control block specifies a data operation using a first data storage device and includes a sister hardware I/O control block field. The host adapter integrated circuit generates another hardware I/O control block upon the sister hardware I/O control block field containing a valid hardware I/O control block identification number. The another hardware I/O control block specifies the data operation using a second data storage device and thereby mirrors the data. In one embodiment, the valid hardware I/O control block identification number is a pointer to a storage site in an array of hardware I/O control block storage sites.

This embodiment of the process places a hardware I/O control block identification number of the single hardware I/O control block in a sister hardware I/O control block field of the another hardware I/O control block. An invalid hardware I/O control block identification number is placed in the sister hardware I/O control block field of the single hardware I/O control block upon completion of execution of the another hardware I/O control block prior to completion of execution of the single hardware I/O control block. Conversely, an invalid hardware I/O control block identification number is placed in the sister hardware I/O control block field of the another hardware I/O control block upon completion of execution of the single hardware I/O control block prior to completion of execution of the another hardware I/O control block. In either situation, completion of execution of only one of the single hardware I/O control block and the another hardware I/O control block is reported.

Hence, in the process of this invention, a hardware I/O control block structure is stored in a memory. The hardware I/O control block structure includes a sister hardware I/O control block field and a target identification field. In one embodiment, the hardware I/O control block structure is one of a plurality of hardware I/O control block structures in the memory.

Thus, a hardware I/O control block memory array according to one embodiment of the present invention includes a first hardware I/O control block having a sister hardware I/O control block field, and a second hardware I/O control block having a sister hardware I/O control block field. The sister hardware I/O control block field of the first hardware I/O control block includes a pointer to the second hardware I/O control block and the sister hardware I/O control block field of the second hardware I/O control block includes a pointer to the first hardware I/O control block.

In yet another embodiment of the present invention, a memory contains processor instructions for a host adapter mirroring process, wherein upon execution of the processor instructions the host adapter mirroring process comprises:

receiving a single hardware I/O control block wherein the single hardware I/O control block specifies a data operation using a first data storage device; and analyzing the single hardware I/O control block to determine whether the single hardware I/O control block specifies a mirrored transaction using a second data storage device.

In still yet another embodiment of the present invention, a memory contains processor instructions for a host adapter mirroring process, wherein upon execution of the processor instructions the host adapter mirroring process comprises:

receiving a single hardware I/O control block by a host adapter integrated circuit wherein the single hardware I/O control block specifies a data operation using a first data storage device and includes a sister hardware I/O control block field; and generating another hardware I/O control block by the host adapter integrated circuit upon the sister hardware I/O control block field containing a valid hardware I/O control block identification number wherein the another hardware I/O control block specifies the data operation using a second data storage device.

BRIEF DESCRIPTION OF THE DRAWINGS

In the figures, elements with the same reference numeral are the same or similar elements. The first digits of a reference numeral for an element indicates the figure in which that element appears.

DETAILED DESCRIPTION

Figure 1:
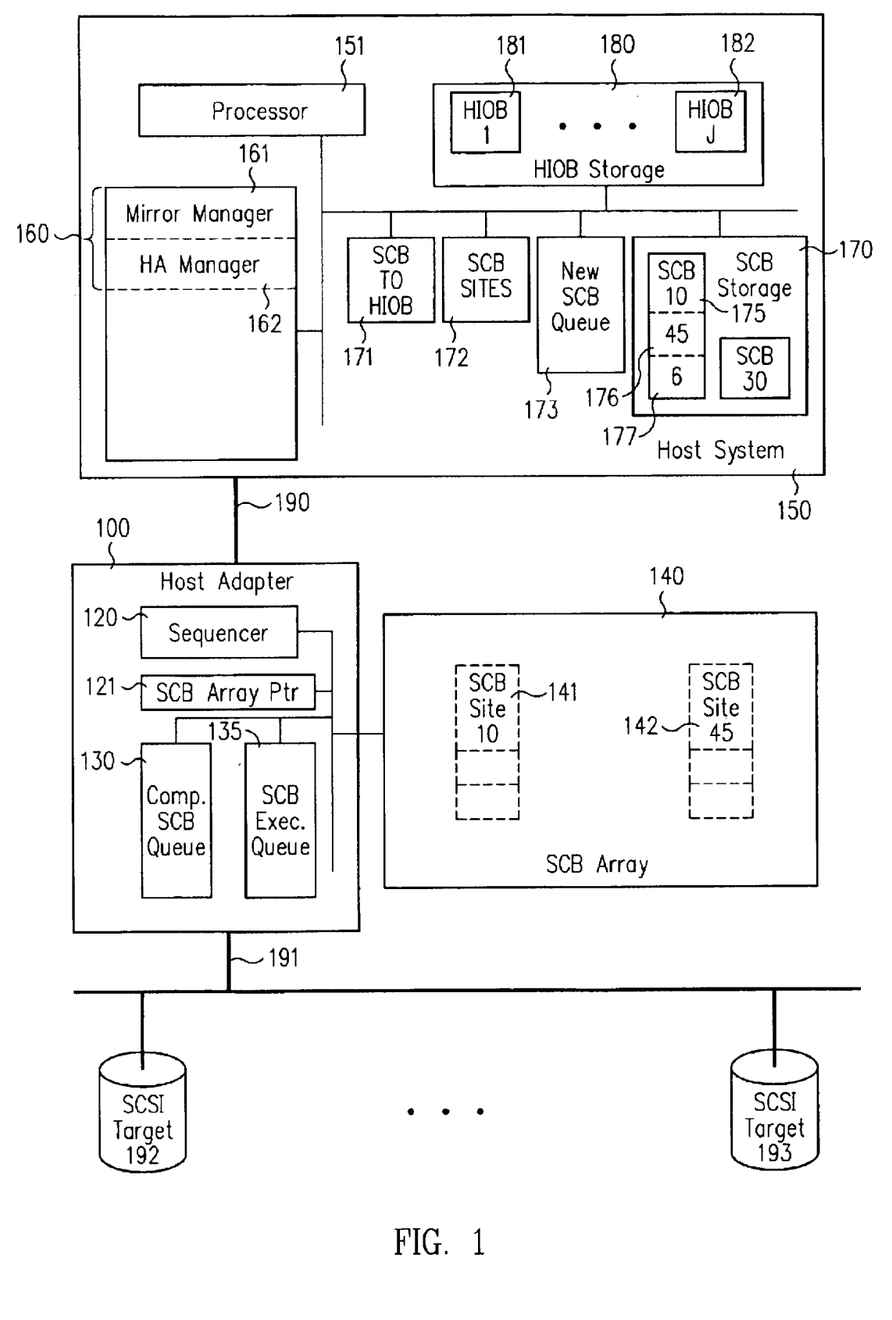
FIG. 1 is a block diagram of a system that includes a host adapter integrated circuit that performs mirrored transactions upon receipt of a single hardware I/O control block according to one embodiment of the present invention.

A host adapter integrated circuit 100, according to one embodiment of the present invention, minimizes the utilization problems of host system 150 associated with the prior art mirroring software, while providing the same functionality and robustness. For a RAID 1 command, e.g., a mirrored transaction, a single hardware I/O control block 175 is generated by host software driver 160 that includes a mirror manager 161 and a host adapter (HA) manager 162, and is transferred over host I/O bus 190 to host adapter integrated circuit 100. Thus, host system 150 must store only a single hardware I/O control block for the mirrored transaction.

For a write transaction, hardware I/O control block 175, sometimes called a sequencer control block (SCB) 175, contains all the original information used to specify a transfer of data from host system 150 to a first target device in a plurality of target devices 192 to 193 on I/O bus 191. The original information in SCB 175 is not affected by this invention. In addition, hardware I/O control block 175 specifies whether the data is to be mirrored, and if so, identifies a second target device on which the data is to be mirrored.

Similarly, for a read transaction, hardware I/O control block 175 contains all the original information used to specify a transfer of data from a first target device in a plurality of target devices 192 to 193 on I/O bus 191 to host system 150, and the original information is not affected by this invention. In addition, hardware I/O control block 175 specifies whether the data to be read is mirrored, and if so, identifies a second target device on which the data is mirrored.

For either a read or a write, after transferring single hardware I/O control block 175 from a memory of host system 150 to a memory of host adapter integrated circuit 100, a sequencer 120 in host adapter integrated circuit 100 determines whether hardware I/O control block 175 specifies a mirrored transaction. If hardware I/O control block 175 specifies a mirrored transaction, in this embodiment, host adapter integrated circuit 100 generates a second hardware I/O control block for the second target device using the information in hardware I/O control block 175.

When the execution of both hardware I/O control block 175 and the second hardware I/O control block are complete, host adapter integrated circuit 100 provides a single completion notification to host system 150. Host system 150 recognizes whether the completion notification is for a mirrored or non-mirrored transaction and processes the completion notification appropriately. If a target device fails during data retrieval, driver 160 accesses the other target device in the mirrored pair of target devices to retrieve the data.

Hence, only a single hardware I/O control block is built in host system 150 for both mirrored and non-mirrored read and write transactions. Only a single hardware I/O control block is moved from host system 150 to host adapter 100 for both mirrored and non-mirrored transactions. Only a single completion notice is provided to host system 150 for both mirrored and non-mirrored read and write transactions. Hence, this invention minimizes traffic over I/O bus 190 for mirrored transactions. This invention enhances memory utilization in host system 150, because only a single hardware I/O control block is required for mirrored transactions and not two as previously required. This invention also enhances the system processor utilization in system 150 because at most one interrupt is required to indicate completion of a mirrored transaction, and only the one hardware I/O control block is built by host system 150.

Herein, when it is indicated that host system 150 and/or host adapter 100 takes an action, those of skill in the art will understand that either an instruction or instructions are executed by a processor that in turn results in the action, or alternatively, automated hardware performs operations that result in the action. The particular technique used to implement the action is not essential to this invention.

In one embodiment of this invention, each SCB, e.g., SCB 175, includes two new fields, a sister SCB site field 176, i.e., a first mirror hardware I/O control block field, and a mirrored target field 177, i.e., a second mirror hardware I/O control block field. If sister SCB site field 176 contains a valid pointer, the pointer is to a storage site in a SCB array 140 for host adapter 100. Hence, in this embodiment, the pointer is a SCB identification number.

Specifically, as explained more completely below, the storage site addressed by the pointer in field 176 is used by host adapter 100 to store a sister SCB that is generated and executed by host adapter 100 to perform the data mirroring transaction, i.e., a read or a write, using the target device specified in mirrored target field 177, in one embodiment. Conversely, if sister SCB site field 176 contains an invalid pointer, e.g., a null pointer, the SCB is executed without data mirroring. In this case, field 177 is not used and the data in field 177 is undefined.

Figure 2:
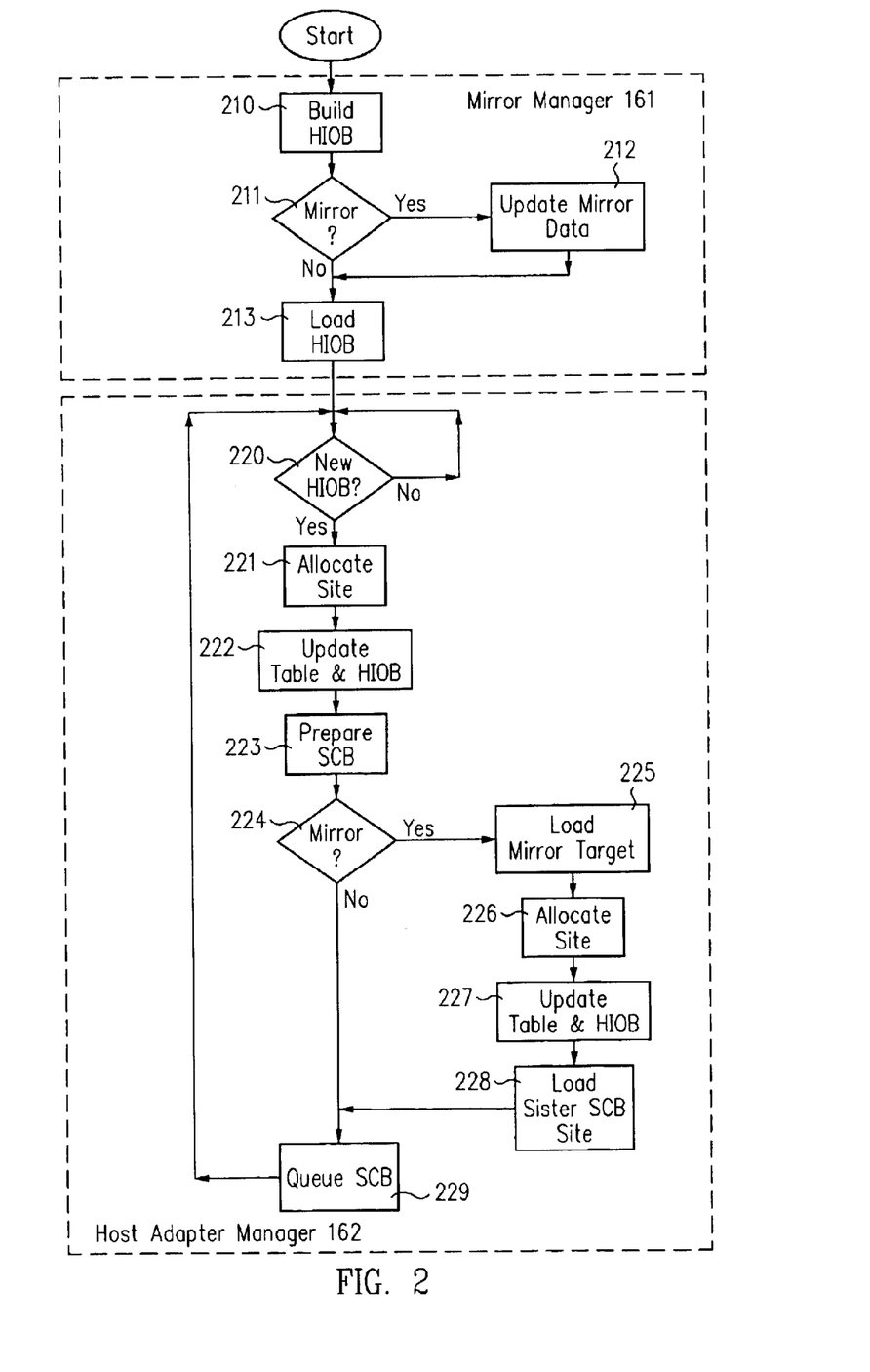
FIG. 2 is a process flow diagram for generating the single hardware I/O control block processed by the host adapter integrated circuit according to one embodiment of the present invention.

In one embodiment of this invention in a build HIOB operation 210, a mirror manager 161 in driver 160 builds a new host I/O block (HIOB), e.g., one host I/O block 181 in a plurality of host I/O blocks 181 to 182, in a memory, which is identified as HIOB storage 180, in response to a request to store data or retrieve data. In this embodiment, mirror manager 161 sets a mirror flag in new host I/O block 181 to false as a default.

Mirror manager 161 determines in mirror check operation 211 whether the request is for mirrored transaction. If the transaction is for mirrored data, processing transfers to update mirror data operation 212 and otherwise to load HIOB 213.

In one embodiment, update mirror data operation 212 changes the state of the mirror flag in new host I/O block 181 to true, and transfers to load HIOB operation 213. In this embodiment, a target device used for mirrored transactions has been prearranged between mirror manager 161 and host adapter manager 162 and so it is unnecessary to specify the mirrored target device in new HIOB 181.

In another embodiment, update mirror data operation 212 changes the state of the mirror flag in new host I/O block 181 to true, and loads a target device field with an identification number of a target device on which the mirrored data is to be written, or from which the mirrored data is to be read. In this embodiment, update mirror operation 212 also transfers to load HIOB operation 213.

In one embodiment of load HIOB operation 213, a pointer to new HIOB 181 is placed in a new HIOB queue (not shown) for host adapter manager 162. Load HIOB operation completes the operation of mirror manager 161 for new HIOB 181.

In this embodiment, host adapter manager 162 checks whether there is a new HIOB in the new HIOB queue in new HIOB check operation 220. If new HIOB 181 is detected, check operation 220 transfers to allocate site operation 221, and otherwise returns to check operation 220.

The serial sequence of operations in FIG. 2 is illustrative only and is not intended to limit the invention to this particular embodiment. For example, host adapter manager 162 need not repeatedly poll in new HIOB check operation 220. An event may occur that notifies host adapter manager 162 that a new HIOB is available, and host adapter manager 162 responds to this event. Hence, check operation 220 is intended only to show that host adapter manager 162 does not process a new HIOB until host adapter manager 162 determines that a new HIOB is available by whatever means are used in a particular application of this embodiment of the present invention.

Also, since FIG. 2 illustrates operations by different entities, these operations may occur in parallel. Finally, the sequence of operations also is only illustrative. Those of skill in the art will be able to implement various sequences of operations that achieve the advantages of this invention in view of this disclosure.

In response to detecting new HIOB 181, host adapter manager 162 accesses SCB sites queue 172, in allocate site operation 221, to ascertain an available storage site in SCB array 140. SCB sites queue 172 is a queue of available sites in SCB array 140. Host adapter manager 162 removes an available storage site, e.g., SCB storage site 141, from SCB sites queue 172 and transfers processing to update table and HIOB operation 222. In this embodiment, the number of the storage site in SCB array 140, e.g., 10, is used as a SCB identification number, which is also a pointer to the storage site within SCB array 140.

In update table and HIOB operation 222, host adapter manager 162 updates SCB to HIOB table 171. Specifically, host adapter manager 162 maintains table 171, which is a table of HIOB addresses as a function of SCB identification numbers. After a SCB identification number has been assigned to a SCB and entered in a field of the SCB, the memory address for the corresponding HIOB, e.g., HIOB 181, is entered in table 171 at the element labeled by the SCB identification number. Hence, in this example, in update table and HIOB operation 222, host adapter manager 162 writes the address of HIOB 181 in HIOB storage 180 in element ten of SCB to HIOB table 171. In addition, operation 222 enters the SCB identification number of the SCB in HIOB 181. Upon completion of update table and HIOB operation 222, processing by host adapter manager 162 transfers to prepare SCB operation 223.

In prepare SCB operation 223, host adapter manager 162 uses the information in HIOB 181 to build SCB 175 in SCB storage 170. The SCB identification number, 10, is loaded in SCB 175, and the other information in SCB 175, except for fields 176 and 177, is generated as in the prior art. Sister SCB site field 176 is set to a default value, which in one embodiment is a null value. Prepare SCB operation 223 transfers processing to mirror check operation 224.

In mirror check operation 224, host adapter manager 162 reads the mirror flag in HIOB 181. If the mirror flag is true, check operation 224 transfers to load mirror target operation 225 and otherwise to queue SCB operation 229.

Upon entry to load mirror target operation 225, host adapter manager 162 loads mirrored target field 177 of SCB 175 with a target identification, which in this example is 6. If HIOB 181 includes the mirrored target identification, the mirrored target device field in HIOB 181 is read to obtain the target identification and then loaded in field 177. In the other embodiment, a default target device is used for mirroring, and host adapter manager 162 loads the target identification of the default target device in field 177. Operation 225 transfers processing to allocate site operation 226.

In allocate site operation 226, host adapter manager 162 again accesses SCB sites queue 172 to ascertain an available storage site in SCB array 140. Host adapter manager 162 removes an available storage site, e.g., SCB storage site 142, which has a SCB identification number of 45, from SCB sites queue 172 and transfers processing to update table and HIOB operation 227.

In update table and HIOB operation 227, host adapter manager 162 again updates SCB to HIOB table 171. In this example, in update table and HIOB operation 227, host adapter manager 162 writes the address of HIOB 181 in HIOB storage 180 in element forty-five of SCB to HIOB table 171. In addition, operation 227 enters the SCB identification number of the mirrored SCB in HIOB 181. Upon completion of update table and HIOB operation 227, processing by host adapter manager 162 transfers to load sister SCB site operation 228.

In load sister SCB site operation 228, host adapter manager 162 writes the SCB identification number of the SCB storage site obtained in operation 226, e.g. 45, in sister SCB site field 176 of SCB 175. Operation 228 transfers to queue SCB operation 229.

In queue SCB operation 229, host adapter manager 162 loads an address to SCB 175 in new SCB queue 173. In one embodiment, the address is a pointer to the location of SCB 175 within SCB storage 170. Operation 229 completes the operations of host adapter manager 162 for SCB 175.

Several advantages of the present invention are apparent at this time. First, a common SCB structure is used for both mirrored and non-mirrored read and write transactions. For mirrored read and write transactions, only a single SCB and a single SCB pointer are stored in the memory of host system 150. Since host adapter manager 162 builds only a single SCB for the mirrored read and write transactions instead of two SCBs, the utilization of processor 151 is nearly 50% less than the prior art approach that built two SCBs for each mirrored transaction. In addition, the memory used to build and store the SCB is also nearly 50% less than the prior art. Hence, prior art host systems that could not support mirroring due to memory or processor utilization limitations can now support mirrored transactions, because the resources required on the host system by this embodiment of the present invention are effectively the same as were required previously for non-mirrored operations.

Sequencer 120 of host adapter 100 executes firmware that determines when host adapter manager 162 has added a new SCB to new SCB queue 173. In one embodiment, sequencer 120 configures a DMA engine in host adapter 100 to transfer the pointer in queue 173 to host adapter 100 and then to transfer the SCB addressed by the pointer. Hence, for both mirrored and non-mirrored read and write transactions, only a single pointer and a single SCB are transferred over I/O bus 190.

The particular method used to transfer the SCBs of this embodiment of the invention from host memory 150 to SCB array 140 is not essential to the invention. However, one way suitable for use in this invention is presented in U.S. Pat. No. 6,006,292, entitled "Method of Managing Hardware Control Blocks Utilizing Endless Queue Maintained to Never be Empty and Containing Tail Pointer Only Accessible by Process Executing on System Processor," of B. Arlen Young issued on Dec. 21, 1999, and incorporated herein by reference in its entirety.

Figure 3A:
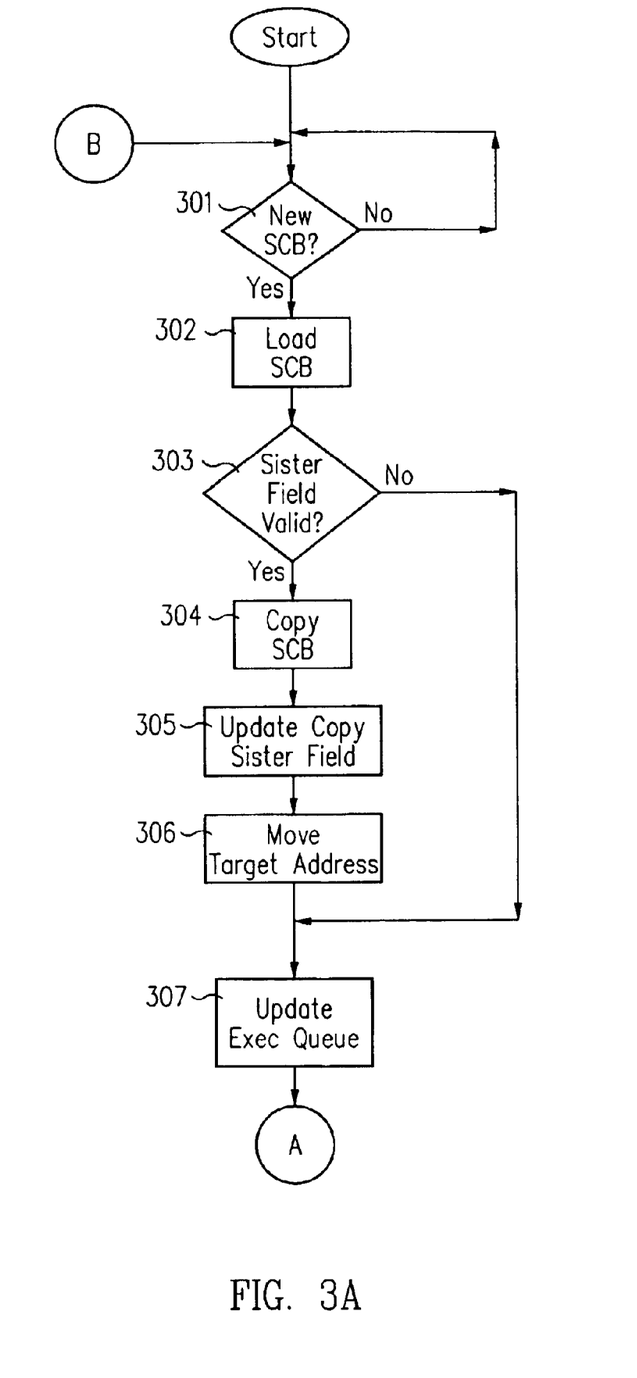
FIG. 3A is a process flow diagram of a first portion of one embodiment of the present invention for a host adapter integrated circuit.
Figure 4A:
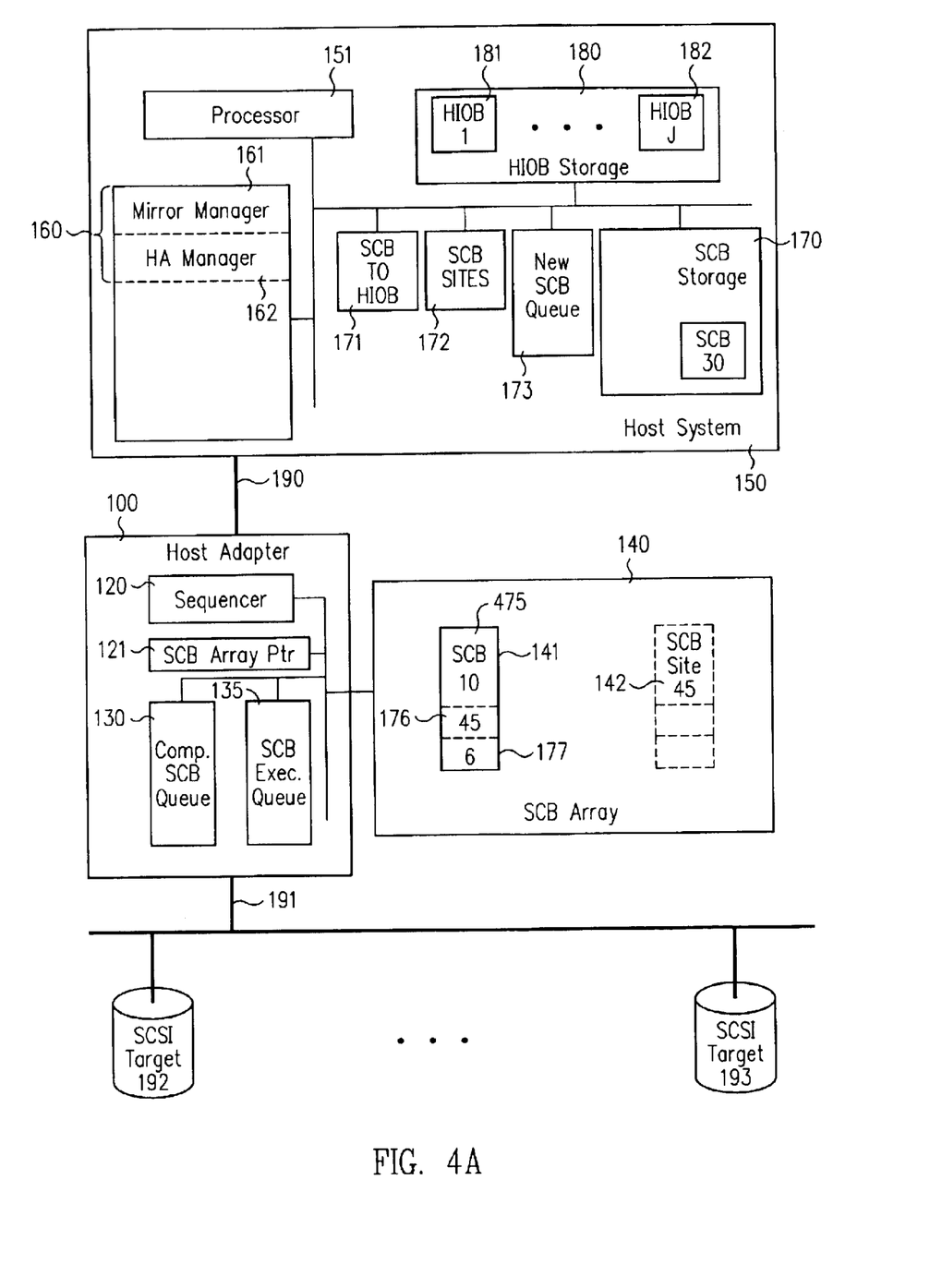
FIGS. 4A to 4C are examples of the system of FIG. 1 at various points in the process flow diagram of FIGS. 3A and 3B or FIGS. 3A and 3C.

Hence, when sequencer 120 determines that a new SCB is available, e.g., SCB 175 (FIG. 1), new SCB check operation 301 (FIG. 3A) transfers processing to load SCB operation 302. In load SCB operation 302, host adapter 100 transfers SCB 175 from SCB storage 170 to storage site 141 in SCB array 140 as SCB 475 (FIG. 4A). The SCB identification number, i.e., 10, is loaded into SCB array pointer register 121 so that pointer register 121 addresses storage location 141. Load SCB operation 302 transfers processing to sister field valid check operation 303.

In sister field valid check operation 303, sequencer 120 reads sister SCB site field 176 in new SCB 475. If sister SCB site field 176 contains a predefined value, e.g., a null identification number, new SCB 475 is executed without further processing related to fields 176 and 177 and so check operation 303 transfers to update execution queue operation 307, which adds the new SCB identification number to SCB execution queue 135 and transfers to execution complete check operation 308.

Figure 4B:
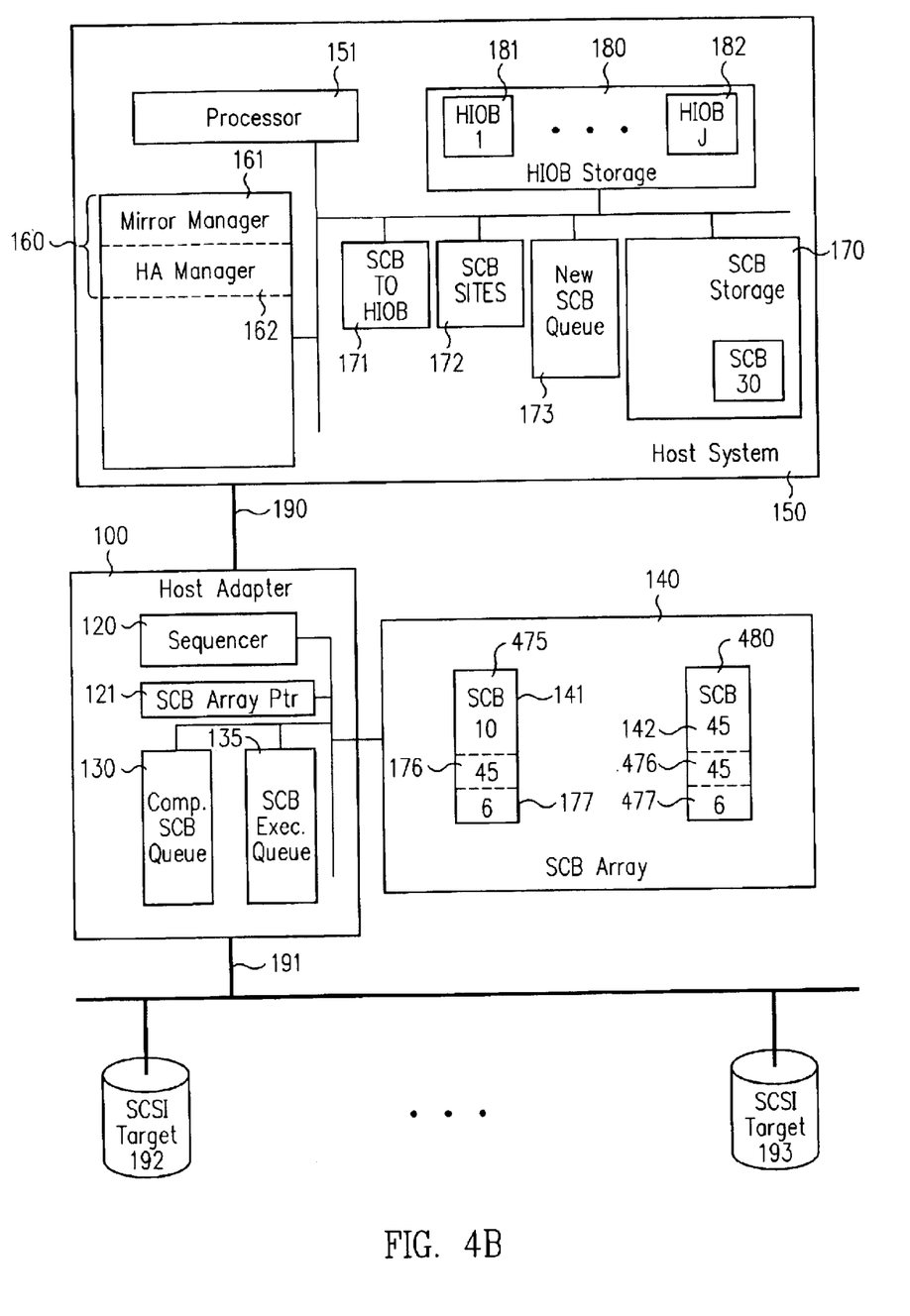

Returning to check operation 303, if sister SCB site field 176 contains a valid SCB identification number, check operation 303 transfers to copy SCB operation 304. In copy SCB operation 304, sequencer 120 copies new SCB 475 to the storage site in SCB array 140 identified by the SCB identification number in sister SCB site field 176 of new SCB 475. Hence, operation 120 creates SCB 480 in storage site 142 as illustrated in FIG. 4B. In one embodiment, the complete SCB is copied, while in another embodiment, everything is copied except fields 176 and 177. Upon completion of the copy, copy SCB operation 304 transfers to update copy sister field operation 305.

Figure 4C:
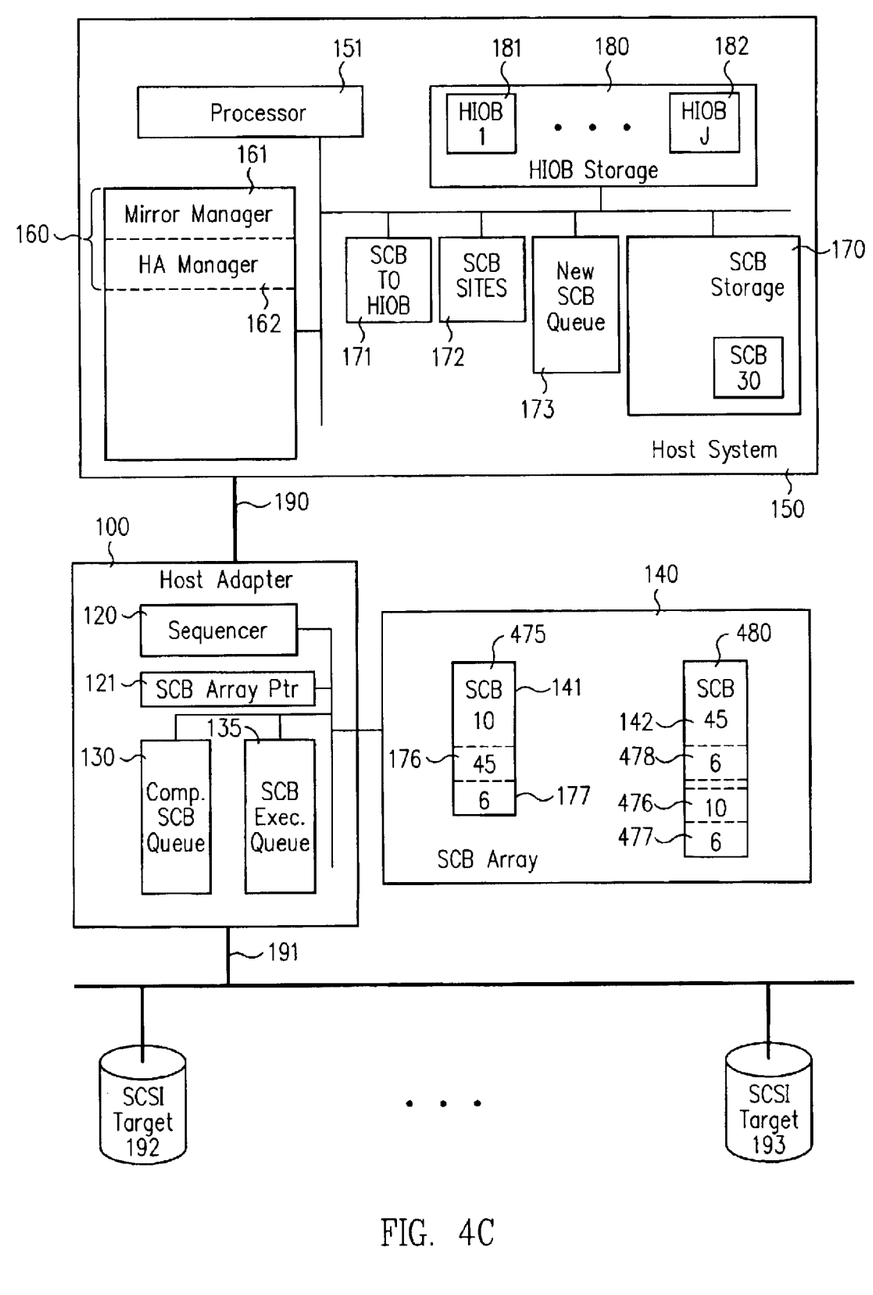

In update copy sister field operation 305, sequencer 120 changes the SCB identification number in sister SCB site field 476 to the SCB identification number of new SCB 475, e.g., 10 as illustrated in FIG. 4C. Thus, the SCB identification number in sister SCB site field 176 in SCB 475 points to mirror SCB 480 and the SCB identification number in sister SCB site field 476 in mirror SCB 480 points to new SCB 475. Operation 305 transfers to move target address operation 306.

Sequencer 120, in move target address operation 306, moves the target address in mirror target address field 477 of mirror SCB 480 to normal target field 478 of mirror SCB 480. Note that if operation 304 did not copy field 177, this operation would copy the target address from field 177 to field 478. Operation 306 transfers to update execution queue operation 307.

Upon entry of operation 307 from operation 306, sequencer 120 appends the SCB identification numbers of both new SCB 475 and mirror SCB 480 to SCB execution queue 135. Hence, in this embodiment, new SCB 475 and mirror SCB 480 are identical except for the data in the sister SCB site fields and different target addresses. Hence, it is no longer necessary to distinguish between the two SCBs and each is said to be a sister of the other.

The pair of sister SCBs in this embodiment of the present invention is executed in the same manner as in the prior art, and independently of each other. For a pair of sister SCBs, i.e., for a mirrored write transaction, the same data is transferred twice from the host system memory, once to each of the two specified target devices on bus 191. However, for a mirrored read, the data is transferred once to the host system memory, and the other SCB is aborted.

Specifically, in one embodiment, execution started check operation 310 (FIG. 3B) determines whether a SCB from execution queue 135 started execution. When a SCB starts execution, check operation 310 transfers processing to sister field valid check operation 311.

Figure 3B:
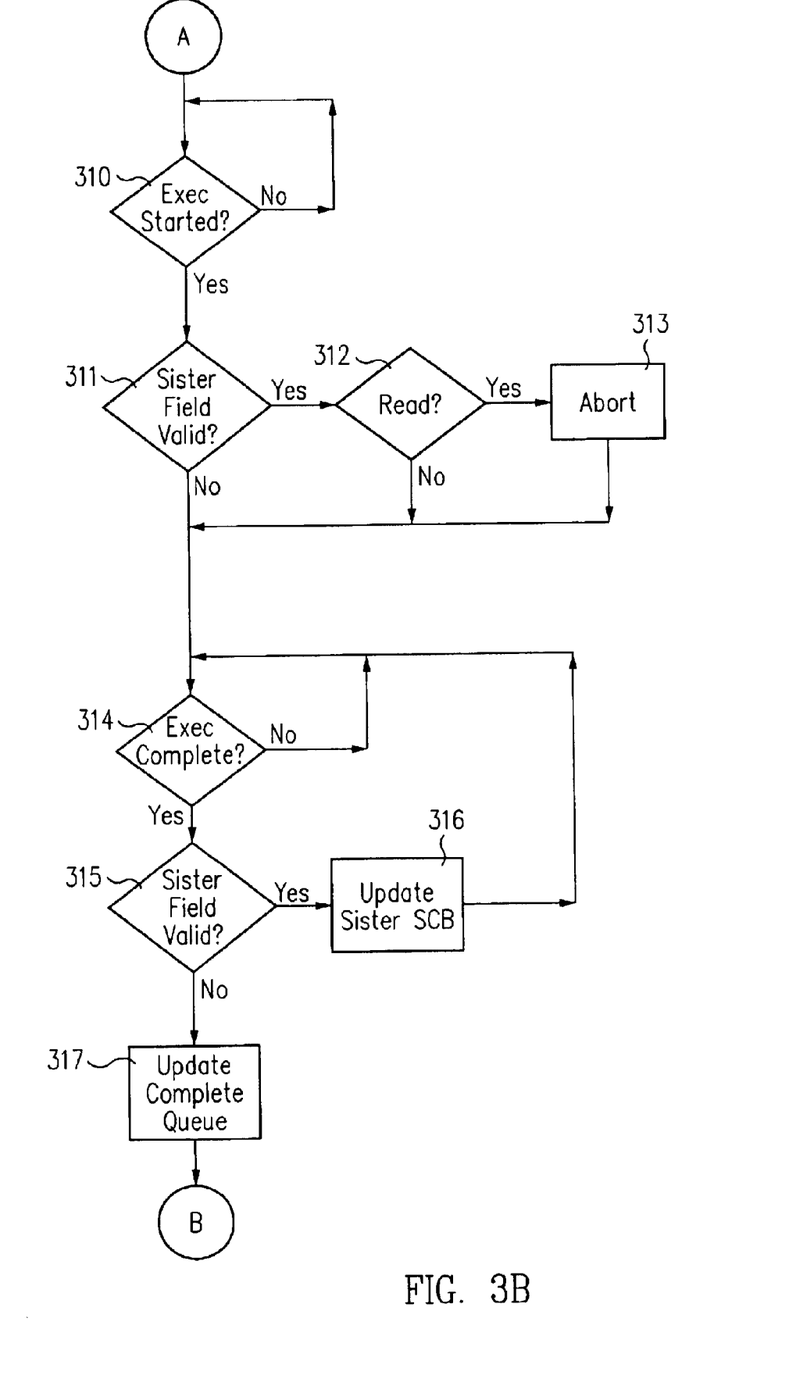
FIG. 3B is a process flow diagram of one embodiment of a second portion of the one embodiment of the present invention for a host adapter integrated circuit.

Sister field valid check operation 311 determines whether the SCB that started execution is part of a mirrored transaction. If the SCB is part of a mirrored transaction, there is a valid SCB identification number in sister SCB site field 176.

Hence, check operation 311 determines whether there is a valid SCB identification number in sister SCB site field 176 of the SCB that started execution. If a valid SCB identification number is detected, check operation 312 transfers to read check operation 312 and otherwise to execution complete check operation 314.

Read check operation 312 determines whether the mirrored transaction is a read transaction. If the mirrored transaction is a read, check operation 312 transfers to abort operation 313 and otherwise to execution complete check operation 314.

For a mirrored read transaction, only one copy of the data is needed by the host system. Consequently, abort operation 313 sets an abort bit in the sister SCB at the SCB location specified in sister SCB site field 176. This causes the target to abort the execution of the sister SCB when execution of the sister SCB is started. Abort operation 313 transfers processing to execution complete check operation 314.

When a SCB has completed execution, execution complete check operation 314 transfers to sister field valid check operation 315. Check operation 315 determines whether there is a valid SCB identification number in the sister SCB site field of the completed SCB, i.e., is the SCB that completed execution one of a pair of SCBs for a mirrored transaction that is not completed.

If there is a valid SCB identification number in the sister SCB site field, it means that this SCB has a sister SCB that has not yet completed execution. Hence, check operation 315 transfers processing to update sister SCB operation 316. Note that sequencer 120 does not put the SCB identification number of the completed SCB in completed SCB queue 130 in this case.

In update sister SCB operation 316, sequencer 120 accesses sister SCB site field 176 in the completed SCB to obtain the SCB identification number of the sister SCB. Sequencer 120 changes the SCB identification number in the sister SCB site field of the sister SCB to a null identification number. Operation 316 returns processing to execution complete check operation 314.

When execution of another SCB is completed, check operation 314 transfers processing to sister field valid check operation 315. As described above, check operation 315 determines whether there is a valid SCB identification number in the sister SCB site field of the completed SCB. If the sister SCB site field of the just completed SCB contains a null identification number, the just completed SCB represents either (1) a non-mirrored data transfer, i.e., a non-mirrored transaction, or (2) a mirrored data transfer, i.e., a mirrored transaction, in which the sister SCB has already completed execution. In either of these two cases, check operation 315 transfers processing to update complete queue operation 317.

In update complete queue operation 317, sequencer 120 puts a pointer to the just completed SCB in complete SCB queue 130. In this embodiment, processing is shown transferring from operation 317 to new SCB operation 301. However, this is illustrative only and is not intended to limit the invention to this particular sequence. When sequencer 120 is notified of or detects a particular event, e.g., a new SCB is available or execution of a SCB is completed, sequencer 120 executes appropriate firmware to handle the event.

The checks and operations in FIGS. 3A and 3B illustrate one embodiment of the actions that are included within the normal operation of sequencer 120 to provide the enhanced host adapter data mirroring capability of this invention. This embodiment anticipates a system in which the mirrored drives are identical and optimizes for rotational latency.

Figure 3C:
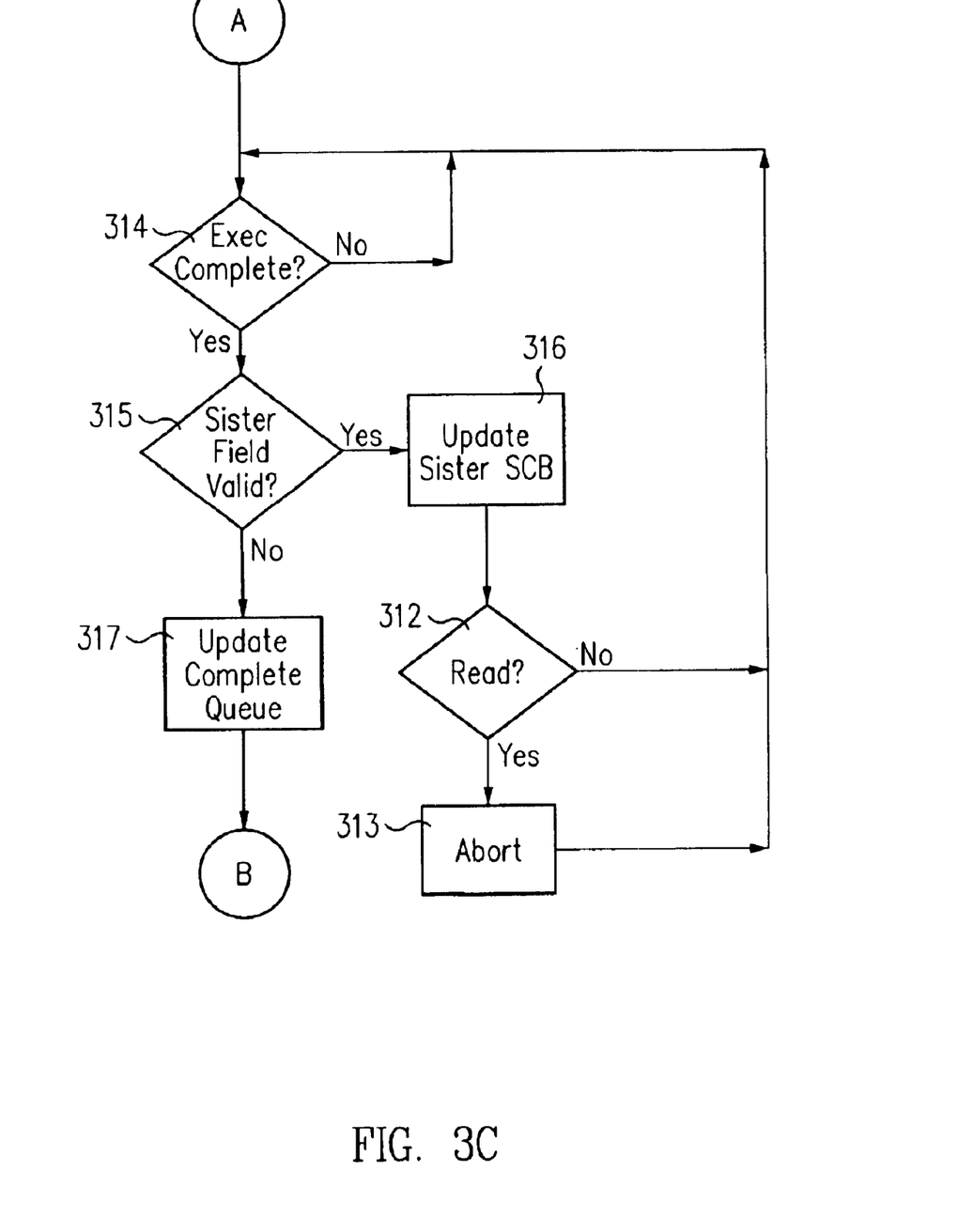
FIG. 3C is a process flow diagram of another embodiment of the second portion of the one embodiment of the present invention for a host adapter integrated circuit.

Another embodiment of the invention is obtained by the combination of FIGS. 3A and 3C. In this embodiment, sequencer 120 performs execution complete check operation 314 (FIG. 3C), as described above. When a SCB completes execution, check operation 314 transfers to sister field valid check operation 315 that also functions as described above.

If the sister SCB site field 176 contains a valid SCB identification number, check operation 315 transfers to update SCB operation 316. Update SCB operation 316 also functions as described above, except operation 316 transfers to read check operation 312.

If the completed SCB was for a mirrored read operation, read check operation 312 transfers to abort operation 313 and otherwise to execution complete check operation 314. Abort operation 313 functions as described above, except abort operation 313, in this embodiment, transfers processing to execution complete operation 314.

Hence, in the embodiment of FIGS. 3A and 3C for a mirrored read operation, the abortion of the second of the sister SCBs is not enabled until after the first of the sister SCBs completes execution. In the embodiment of FIGS. 3A and 3B for a mirrored read operation, the abortion of the second of the sister SCBs is enabled as soon as the first of the sister SCBs starts execution. In most situations, the embodiment of FIGS. 3A and 3B is anticipated to provide better performance. Nevertheless, in some systems, the embodiment of FIGS. 3A and 3C may also give acceptable performance.

As described with respect to FIG. 3A to 3C, when host adapter 100 generates a sister SCB for a mirrored transaction and when both of the SCBs for the mirrored transaction have completed execution, only one of the two SCBs is posted in complete SCB queue 130. Hence, when sequencer 120 notifies host adapter manager 162 that there are completed SCBs in queue 130, host adapter manager 162 uses SCB to HIOB table 171 to determine the HIOB associated with the completed SCB. Host adapter manager 162 reads the SCB identification number or SCB identification numbers stored in the HIOB and returns the numbers to SCB sites queue 172 and reports the HIOB as complete to the original caller.

The processes of this invention, in one embodiment, are stored as processor instructions in a memory and upon execution of the processor instructions the process is performed. This memory can be either a single memory unit or multiple memory units.

For example, in one embodiment of the present invention, a memory contains processor instructions for a host adapter mirroring process, wherein upon execution of the processor instructions the host adapter mirroring process comprises:

receiving a single hardware I/O control block wherein the single hardware I/O control block specifies a data operation using a first data storage device; and analyzing the single hardware I/O control block to determine whether the single hardware I/O control block specifies a mirrored transaction using a second data storage device.

In another embodiment of the present invention, a memory contains processor instructions for a host adapter mirroring process, wherein upon execution of the processor instructions the host adapter mirroring process comprises:

receiving a single hardware I/O control block by a host adapter integrated circuit wherein the single hardware I/O control block specifies a data operation using a first data storage device and includes a sister hardware I/O control block field; and generating another hardware I/O control block by the host adapter integrated circuit upon the sister hardware I/O control block field containing a valid hardware I/O control block identification number wherein the another hardware I/O control block specifies the data operation using a second data storage device.

In view of this disclosure, those of skill in the art can implement host adapter mirroring for a variety of different target devices. For example, the use of SCSI devices is illustrative only and is not intended to limit the invention to such devices.

I claim:

1. A method comprising:

receiving a single hardware I/O control block by a host adapter integrated circuit wherein said host adapter integrated circuit interfaces two I/O buses and further wherein said single hardware I/O control block specifies a read data transaction for a first data storage device; and analyzing said single hardware I/O control block by said host adapter integrated circuit to determine whether information in said single hardware I/O control block specifies a mirrored read data transaction for a second data storage device.

2. The method of claim 1 wherein said analyzing said single hardware I/O control block further comprises:

determining, by said host adapter integrated circuit, whether an entry in a first mirror hardware I/O control block field of said single hardware I/O control block is valid.

3. The method of claim 2 further comprising:

generating, by said host adapter integrated circuit, a second hardware I/O control block upon determining said entry in said first mirror hardware I/O control block field is valid wherein said second hardware I/O control block specifies said mirrored read data transaction for said second data storage device.

4. The method of claim 3 further comprising:

executing said first hardware I/O control block and said second hardware I/O control block independently by said host adapter integrated circuit.

5. The method of claim 3 further comprising:

enabling an abort of execution of one of said first hardware I/O control block and said second hardware I/O control block upon start of execution of a different one of said first hardware I/O control block and said second hardware I/O control block wherein said different one is a first to start execution.

6. The method of claim 5 further comprising:

posting as complete only a last of said first and second hardware I/O control blocks to complete executing.

7. The method of claim 2 further comprising:

executing said first hardware I/O control block by said host adapter integrated circuit as a non-mirrored read data transaction upon determining said entry in said first mirror hardware I/O control block field is invalid.

8. A method comprising:

receiving a single hardware I/O control block by a host adapter integrated circuit wherein said single hardware I/O control block specifies a read data operation from a first data storage device and includes a sister hardware I/O control block field; and generating another hardware I/O control block by said host adapter integrated circuit upon said sister hardware I/O control block field containing a valid hardware I/O control block identification number wherein said another hardware I/O control block specifies said read data operation for a second data storage device so that said read data transaction is mirrored.

9. The method of claim 8 wherein said valid hardware I/O control block identification number is a pointer to a storage site in an array of hardware I/O control block storage sites.

10. The method of claim 8 further comprising:

placing a hardware I/O control block identification number of said single hardware I/O control block in a sister hardware I/O control block field of said another hardware I/O control block.

11. The method of claim 8 wherein said another hardware I/O control block includes a sister hardware I/O control block field, and said method further comprises:

placing a null hardware I/O control block identification number in said sister hardware I/O control block field of said single hardware I/O control block upon completion of execution of said another hardware I/O control block prior to completion of execution of said single hardware I/O control block.

12. The method of claim 8 wherein said another hardware I/O control block includes a sister hardware I/O control block field, and said method further comprises:

placing a null hardware I/O control block identification number in said sister hardware I/O control block field of said another hardware I/O control block upon completion of execution of said single hardware I/O control block prior to completion of execution of said another hardware I/O control block.

13. The method of claim 8 further comprising:

reporting completion of execution of only one of said single hardware I/O control block and said another hardware I/O control block.

14. The method of claim 8 further comprising:

reporting completion of execution of said single hardware I/O control block only if said sister hardware I/O control block field of said single hardware I/O control block contains a predefined value.

15. The method of claim 8 further comprising:

reporting completion of execution of said another hardware I/O control block only if said sister hardware I/O control block field of said another hardware I/O control block contains a predefined value.

16. A method comprising:

receiving a single hardware I/O control block by a host adapter integrated circuit wherein said single hardware I/O control block specifies a read data operation for a first data storage device and includes a sister hardware I/O control block field;

generating another hardware I/O control block by said host adapter integrated circuit upon said sister hardware I/O control block field containing a valid hardware I/O control block identification number wherein said another hardware I/O control block specifies said read data operation for a second data storage device so that said read data transaction is mirrored;

placing a hardware I/O control block identification number of said single hardware I/O control block in a sister hardware I/O control block field of said another hardware I/O control block;

placing a null hardware I/O control block identification number in said sister hardware I/O control block field of one of said single hardware I/O control block and another hardware I/O control block upon completion of execution of a different one of said single hardware I/O control block and said another hardware I/O control block wherein said different one is a first to complete execution; and reporting completion of execution of only one of said single hardware I/O control block and said another hardware I/O control block.

17. A structure comprising:

a memory containing processor instructions for a host adapter mirroring process, wherein upon execution of said processor instructions said host adapter mirroring process comprises:

receiving a single hardware I/O control block by a host adapter integrated circuit wherein said host adapter integrated circuit interfaces two I/O buses and further wherein said single hardware I/O control block specifies a read data transaction for a first data storage device; and     analyzing said single hardware I/O control block by said host adapter integrated circuit to determine whether information in said single hardware I/O control block specifies a mirrored read data transaction for a second data storage device.

18. A structure comprising:

a memory containing processor instructions for a host adapter mirroring process, wherein upon execution of said processor instructions said host adapter mirroring process comprises:

receiving a single hardware I/O control block by a host adapter integrated circuit wherein said single hardware I/O control block specifies a read data operation for a first data storage device and includes a sister hardware I/O control block field; and     generating another hardware I/O control block by said host adapter integrated circuit upon said sister hardware I/O control block field containing a valid hardware I/O control block identification number wherein said another hardware I/O control block specifies said read data operation for a second data storage device so that said read data transaction is mirrored.

* * * * *